United States Patent [19]

Elfert et al.

[11] 4,269,967

[45] May 26, 1981

[54] SEMIPERMEABLE MEMBRANES OF AROMATIC DISULFIMIDE CONTAINING POLYAMIDES

[75] Inventors: Klaus Elfert; Gerhard D. Wolf; Hans J. Rosenkranz, all of Dormagen, Fed. Rep. of Germany

[73] Assignee: Bayer Aktiengesellschaft, Leverkusen, Fed. Rep. of Germany

[21] Appl. No.: 43,623

[22] Filed: May 30, 1979

Related U.S. Application Data

[63] Continuation of Ser. No. 835,313, Sep. 21, 1977, abandoned.

[30] Foreign Application Priority Data

Sep. 24, 1976 [DE] Fed. Rep. of Germany ....... 2642979

[51] Int. Cl.$^3$ .............................................. C08G 69/32
[52] U.S. Cl. .................................. 528/337; 264/216; 428/35; 210/500.2; 528/172; 528/173; 528/184; 528/336; 528/344; 528/348
[58] Field of Search ............... 528/337, 184, 172, 173; 210/500 M

[56] References Cited

U.S. PATENT DOCUMENTS

| | | | |
|---|---|---|---|
| 3,664,986 | 5/1972 | MacDonald | 528/337 |
| 3,676,525 | 7/1972 | Wolf et al. | 528/337 |
| 3,696,031 | 10/1972 | Credali et al. | 528/337 |
| 3,755,263 | 8/1973 | Bodesheim et al. | 528/337 |
| 3,786,024 | 1/1974 | Wolf et al. | 528/337 |
| 4,123,424 | 10/1978 | Credali et al. | 528/337 |
| 4,129,559 | 12/1978 | Credali et al. | 528/337 |

*Primary Examiner*—Harold D. Anderson
*Attorney, Agent, or Firm*—Connolly and Hutz

[57] ABSTRACT

The invention relates to membranes which consist of aromatic polyamides containing disulphimide groups and have relative viscosities $\eta_{rel}$ of $\geq 1.4$ as measured on a 0.5% N-methylpyrrolidone solution at 20° C., and which may be used for ultrafiltration and inverse osmosis. The membranes of these polyamides according to the invention have a high permeability to water, for example, a throughflow of 1000–5000 1/m$^2$d under a pressure of 20 bars, and a high retention capacity for dissolved substances.

7 Claims, No Drawings

SEMIPERMEABLE MEMBRANES OF AROMATIC DISULFIMIDE CONTAINING POLYAMIDES

This is a Continuation, Ser. No. 835,313, filed Sept. 21, 1977, now abandoned.

This invention relates to semipermeable membranes of aromatic polyamides and to their use for ultrafiltration and inverse osmosis.

Ultrafiltration and inverse osmosis are mass separation processes. In these mass separation processes, an aqueous solution is passed under pressure over the surface of a semipermeable membrane. The solvent and, possibly, some of the dissolved substances penetrate through the membrane whilst the remaining components of the solution are retained on the surface of the membrane.

In contrast to an inverse osmosis membrane of the type used, for example, for desalting water, an ultrafiltration membrane is permeable not only to the solvent but it is in general also permeable to low molecular weight substances such as, for example, inorganic salts or organic substances of low molecular weight, whereas substances with a higher molecular weight than the above-mentioned compounds are retained by the membrane and concentrated in the delivered solution. There is a flexible transition between the ranges of application of ultrafiltration and inverse osmosis. Ultrafiltration may generally be associated with the concentration of substances with molecular weights above 500. The operating pressures applied in ultrafiltration ($\leq 40$ bars) are lower than those applied in inverse osmosis.

Membrane processes may be used as relatively simple inexpensive processes for concentrating, removing or recovering a variety of different substances from aqueous solutions. Potential applications are in the food industry for concentrating whey or fruit juices or for the careful separation or concentration of biological or pharmaceutical products in the pharmaceutical industry. By membrane filtration, it is possible to remove substances from industrial effluents and to enrich and recover valuable substances from production processes. Examples of this are the recovery of lacquer constituents from spent dye baths in electro-dip-lacquering, the concentration of oil-containing effluents of the type which accumulate in the metal-processing industry where drilling and cutting oils are used, and the treatment of effluents in the organic chemical industry, especially the dyestuff and textile industries.

The development of stable and efficient membranes is still one of the main problems of this process. Numerous polymers have been investigated for their suitability as membrane material. They have to satisfy certain requirements in regard to their permeability and their selectivity and, in addition, have to be chemically, thermally and mechanically stable.

Numerous polymers from which ultrafiltration and inverse osmosis membranes can be produced are known. The membranes generally used in practice are membranes of cellulose derivatives, especially cellulose acetate. Membranes of these polymers have a high filtration capacity and may be produced with a variety of different separation limits. However, they also have some unfavourable properties which restrict their general usefulness. These are their inadequate resistances to chemicals and, in particular, their sensitivity to hydrolysis at high and low pH values, and also their susceptibility to degradation by microorganisms. This gradually results in a deterioration in their selectivity and in a limited service life in operation. U.S. Pat. No. 3,567,632 describes membranes of aromatic polyamides which are superior to cellulose acetate membranes in their resistance to chemical influences, but have the disadvantage by comparison with cellulose acetate membranes of a much lower permeability to water.

An object of the present invention is to obviate the disadvantages referred to above and to develop resistant membranes which are distinguished by high permeability to water.

It has surprisingly been found that polymer membranes with considerably increased permeability to water, coupled with extremely good separation properties, can be produced from copolyamides containing disulphimide groups.

It is therefore an object of the present invention to provide membranes which consist of aromatic polyamides containing disulphimide groups and having relative viscosities $\eta_{rel}$ of $\geq 1.4$, as measured on a 0.5% N-methylpyrrolidone solution at 20° C., and which may be used for ultrafiltration and inverse osmosis.

The membranes of these polyamides according to the invention have a high permeability to water, for example, a throughflow of 1000–5000 l/m²d under a pressure of 20 bars, and a high retention capacity for dissolved substances.

Another advantage of the membranes produced from the polyamides according to the invention is their selectivity. These membranes have little or no retention capacity for inorganic salts and may be used for removing certain organic substances from aqueous solutions additionally containing salts by the process of inverse osmosis.

In this way, it is possible to separate the feed stream into a concentrate which mainly contains the organic constituents, but very little salt, and a permeate freed from organic constituents.

The aromatic polyamides containing disulphimide groups which may be used in accordance with the invention for producing high-throughflow membranes with a very high retention capacity, preferably for compounds of relatively high molecular weight (MW >300), consist to a level of up to 100 mol% and preferably to a level of 20 to 80 mol%, based on the total quantity of the structural segments derived from the diamines or from the dicarboxylic acid halides, of structural segments containing a disulphimide group and corresponding to the general formulae:

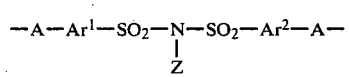

or

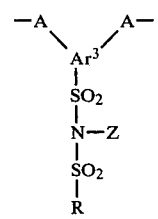

in which
Ar¹ and Ar² may be the same or different and represent divalent aromatic radicals, consisting of one or several condensed aromatic rings or of aromatic rings attached to one another through a single bond or through a —CH$_2$—, —O—, —S— or —SO$_2$— group, and their alkyl and halogen substitution products, Ar$^3$ is a trivalent aromatic radical, R represents a C$_{1-4}$-alkyl radical or an optionally alkyl- or halogen- substituted phenyl radical, Z may be hydrogen or an alkali metal, and A represents the amide group of the formula —CONH— or —NHCO— and to a level of up to 80 mol% of structural segments of known aromatic polyamides.

These polyamides containing disulphimide structures may be obtained by the homopolycondensation or copolycondensation of aromatic diamines or dicarboxylic acid derivatives (e.g. dihalides) containing disulphimide groups with other aromatic diamines and dicarboxylic acids, optionally containing heterocycles, by interfacial polycondensation or by polycondensation in solution.

Aromatic diamines suitable for copolycondensation with diamines containing disulphimide structures are, in principle, any aromatic diamines or aromatic heterocycle-containing diamines of the type described, for example, in U.S. Pat. Nos. 2,989,495 (column 4, lines 1-70), 3,354,127, 3,349,062, in German Offenlegungsschrift No. 1,720,728 (Examples 1-6), in German Offenlegungsschrift No. 1,881,411 (pages 3-4; corresponds to U.S. Pat. No. 3,671,614), in German Offenlegungschrift No. 1,946,789 (pages 3-4) and in German Offenlegungsschrifts Nos. 1,720,686 (corresponds to U.S. Pat. No. 3,527,732) and 1,720,687 (corresponds to British Pat. No. 1,223,457).

The aromatic disulphimides used preferably correspond to the general formula:

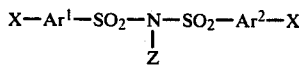

in which

X represents an —NH$_2$—group or the —COHal— Group where Hal is preferably Cl or Br, Z represents hydrogen or an alkali metal, and Ar$^1$ and Ar$^2$ may be the same or different and represent divalent aromatic radicals consisting of one or more condensed aromatic rings or of aromatic rings attached to one another through a —CH$_2$—, —O—, —S—, or —SO$_2$— group, and their alkyl and halogen substitution products.

However, the aromatic disulphimides used may also correspond to the following general formula:

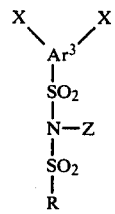

in which

X and Z are as defined above,

R represents a C$_{1-4}$-alkyl radical or an optionally alkyl-or halogen-substituted aromatic radical, and Ar$^3$ represents a trivalent aromatic radical, preferably corresponding to the following formulae:

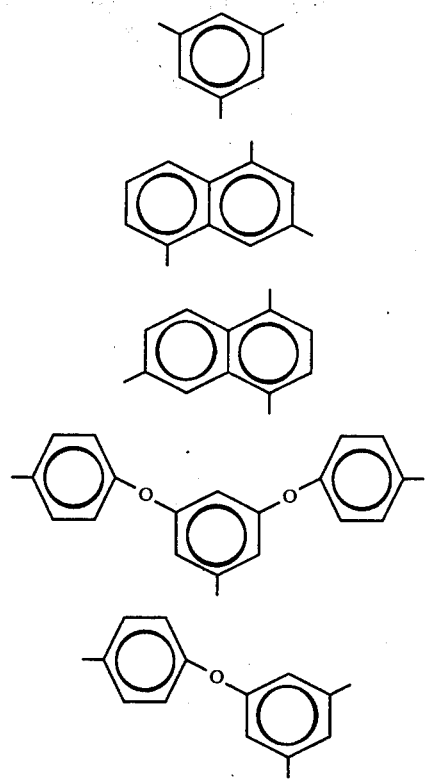

The following disulphimides which correspond to the above formulae may be used for example:
4,4'-diaminodiphenyl disulphimide
3,3'-diaminodiphenyl disulphimide
3,4'-diaminodiphenyl disulphimide
3,3'-diamino-4,4'-dichlorodiphenyl disulphimide
4,4'-diamino-3,3'-dichlorodiphenyl disulphimide
3,3'-diamino-4-chlorodiphenyl disulphimide
4,4'-dichloroformyl diphenyl disulphimide
3,3'-dichloroformyl diphenyl disulphimide
3,4'-dichloroformyl diphenyl disulphimide
4-(p-aminophenoxy)-3'-aminodiphenyl disulphimide
5-aminophenyl-4'-aminonaphthyl-(1)-disulphimide
3,5-diaminodiphenyl disulphimide
3,5-diamino-5-chlorodiphenyl disulphimide
3,5-diaminophenyl methyl disulphimide
3,5-dichloroformyl diphenyl disulphimide
3,5-dichloroformyl phenyl methyl disulphimide
1,5-diaminonaphthyl-(3)-phenyl disulphimide
1,4-diaminonaphthyl-(6)-phenyl disulphimide
1,5-diaminonaphthyl-(3)-methyl disulphimide The disulphimides described above may be obtained by reacting sulphonic acid chlorides with sulphinic acid amides in alkaline medium (Ber. 75, 523 (1942)) or by reacting sulphonyl thionyl amines with sulphonic acids (German Pat. No. 1,235,300).

The homopolyamides or copolyamides containing the disulphimide groups are preferably produced by polycondensation in solution, although they may also be produced by interfacial condensation. To this end, it is preferred initially to introduce a diamine containing the disulphimide group either on its own or together with a heterocycle-containing diamine (although in this case the quantity of the disulphimide diamine should amount to at least 20 mol%, based on the total quantity of diamine) into a polar organic solvent, and then to add the aromatic dicarboxylic acid dihalide slowly and in portions. However, it is also possible initially to introduce a fully aromatic or an aromatic heterocycle-containing diamine in a polar organic solvent and then to add, slowly and in portions, a disulphimide-containing dicarboxylic acid dihalide either on its own or in admixture with other aromatic dicarboxylic acid dihalides. In this case, too, the quantity of the disulphimide-containing dicarboxylic acid dihalide should amount to at least 20 mol%, based on the total quantity of the dicarboxylic acid dihalide.

It is advantageous in the invention that the polyamides containing disulphimide structures should contain as many disulphimide groups as possible because it has been found that the membrane properties are particularly good with high disulphimide contents. Accordingly, it is desirable to use as high a percentage as possible, and at least 20 mol%, of a disulphimide diamine, baed on the total quantity of diamine, or of a dicarboxylic acid dichloride containing the disulphimide group, based on the total quantity of dicarboxylic acid dichloride.

In some cases, an upper limit is imposed on the content of disulphimide structures by the fact that some polycondensates with a very high disulphimide content become soluble in water. However, this depends upon the structure of the components used and may readily be determined by a few simply preliminary tests.

The polar organic solvents used are N,N-dialkyl carboxylic acid amides, for example N,N-dimethylacetamide or N-substituted lactams such as, for example, N-methyl pyrrolidone. The great advantage of these solvents is that there is no need to use additional acid acceptors. In order to obtain reaction products with as high a molecular weight as possible, it is best to use the diamine component and the dicarboxylic acid dihalide component in equivalent or substantially equivalent quantities. The condensation reaction is generally carried out at temperatures of from −30° C. to +150° C. and preferably at temperatures of from −10° C. to +50° C. The reaction times are between one and thirty hours. The solids content of the solutions amounts to between 5 and 40% and preferably between 10 and 25%.

If the structure of the diamines and dicarboxylic acid dihalides is such that together they form polyamides which are insoluble in polar organic solvents, up to 5%, based on the quantity of solvent, of an alkali or alkaline earth metal salt, preferably LiCl or $CaCl_2$, must be added as solution promoter before or during polycondensation in order to prevent the corresponding polyamide from precipitating from the solution.

The membranes produced from the polyamides used in accordance with the invention are preferably asymmetrical membranes which are characterised by the following structure: the actual selective separation layer is extremely thin and merges substantially continuously with a porous underlayer of the same material which acts as a carrier or supporting layer. One advantage of these membranes is that all substances are separated off at the surface of the membrane where they can be removed by the flow of the charging solution. In this way, the service life of the membranes is increased because they cannot become obstructed that quickly.

To produce the membranes according to the invention, a homogeneous solution of the corresponding polymer is prepared in a suitable solvent, preferably a solvent of the amide type. For example, from 5-35% by weight of the polyamide, based on the total quantity of polymer and solvent, are dissolved in a polar aprotic solvent in the presence of from 1 to 10% by weight of an alkali or alkaline earth metal salt, preferably LiCl, LiBr, $LiNO_3$, $MgCl_2$, $CaCl_2$ or $CaBr_2$, or of an organic amine, such as triethyl amine, tripropylamine, pyridine, ethanolamine or triethanolamine. Preferred solvents are dimethyl fermamide, dimethyl acetamide, N-methyl-pyrrolidone, hexamethyl phosphoric acid triamide, dimethyl sulphoxide and mixtures thereof. In order to accelerate the dissolution process heat may optionally be applied.

This casting solution is used for producing films by applying it to a glass or metal substrate or to any other suitable substrate, for example a moving belt or drum, in a layer thickness of generally from 150 to 500 μ.

The solvent is partly evaporated off by a heat treatment. The film is dried at a temperature of from 40° to 150° C. over a period ranging from 2 to 60 minutes. This step may even be omitted, depending upon the required membrane properties of the film.

After a cooling phase of 10 minutes, the film is immersed in a precipitation bath and left there for 60 minutes. Suitable precipitation liquids are solvents of the type which are miscible with the organic solvent of the casting solution and which are capable of dissolving the salt, if any, but which are non-solvents for the polyamide. Solvents suitable for this purpose are water, methanol, ethanol or i-propanol, optionally with the addition of salts, such as $CaCl_2$ for example. The preferred precipitant is water. The temperature of the precipitation bath may be in the range of from 0° C. to 50° C. and is preferably in the range of from 0° C. to 25° C.

The membranes according to the invention may also be used in the form of films, tubes, hoses or hollow fibres. The production techniques for hoses, tubes and hollow fibres correspond analogously to the above-described process. The processes known to the expert for producing tubes, hoses and hollow fibres from polymer solutions are used in this case.

In order to determine the effectiveness of the membranes, the finished membrane is applied to a porous sintered plate of metal, on which a filter paper has been placed, and introduced into a pressure filtration apparatus in which the various solutions of the test substances in water are pumped over the membrane surface at room temperature and under various pressures. The output of the pump is 1.5 l/h and the effective surface area of the membrane is approximately 12 $cm^2$.

The throughput of water in liters/$m^2$/day is an indication of the filtration efficiency of the membrane. The percentage retention is normally expressed as follows:

$$\text{Retention} = (1 - \frac{\text{concentration of dissolved substance in the filtrate}}{\text{concentration of dissolved substance in the starting solution}}) \cdot 100$$

Production of the disulphimide compound 200 parts by weight of a 20% sodium hydroxide solution were added to a suspension of 202 parts by weight of m-nitrobenzene sulphonamide in 1200 parts by weight of water. A solution of 242 parts by weight of m-nitrobenzene sulphochloride in 400 parts by weight of acetone and 210 parts by weight of a 20% sodium hydroxide solution were simultaneously added dropwise at room temperature in such a way that a pH-value of from 10 to 11 was maintained. After stirring for two hours at 50° C., the product was cooled, filtered under suction and then thoroughly washed with sodium hydroxide and water. The residue consisted of sodium 3,3′-dinitrodiphenyl disulphimide (melting point 258°–260° C.), from which sodium 3,3′-diaminodiphenyl disulphimide melting at 286°–288° C. was obtained by catalytic hydrogenation.

The invention is illustrated by the following Examples, in which the percentages are by weight.

EXAMPLE 1

93.8 parts by weight of 3-(p-aminophenyl)-7-amino 2,4-(1H, 3H) quinazoline dione (formula I):

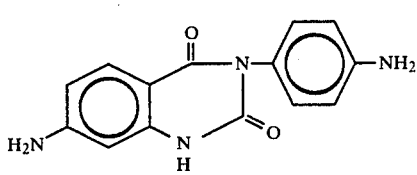

(I)

and 52.4 parts by weight of sodium 3,3′-diaminodiphenyldisulphimide (formula II):

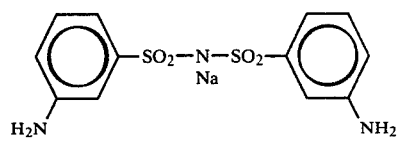

(II)

were introduced into 750 parts by weight of absolute dimethyl acetamide. 101.5 parts by weight of isophthalic acid dichloride were then added in portions with constant stirring at approximately 10° C., and the solution, which became increasingly viscous, was stirred for about 12 hours at room temperature. In the meantime another 400 parts by weight of dimethyl acetamide had to be added to reduce the high viscosity. The solution was then sprayed into water. To this end, it was advisable to dilute the solution with more dimethyl acetamide. The polymer precipitated into water was filtered off under suction, washed thoroughly with water and dried. The relative viscosity $\eta_{rel}$ amounted to 1.73, as measured on a 0.5% solution of the polyamide in M-methyl pyrrolidone at 20° C. (the viscosities quoted in the following Examples were measured under the same conditions).

A casting solution was prepared from 12 g of this polymer, 4.8 g of $CaCl_2$ and 83.2 g of N-methyl pyrrolidone by stirring and heating to 60° C. A 350μ thick film was applied to a glass plate, after which the solvent was evaporated off over a period of 20 minutes at 60° C. After a cooling phase of 10 minutes, the film was immersed in an ice water bath and left there for 30 minutes. During this time the film detached itself from the glass plate. The finished membrane was stored in water at room temperature.

Test solution: 0.1% aqueous solution of a dye (Siriuslichtblau G).
Pressure: 20 bars. Under the conditions specified, this membrane had a throughflow of 3350 liters/m²d for 99% retention of the dye.

EXAMPLE 2

Following the procedure of Example 1, a copolyamide with a relative viscosity $\eta_{rel}$ of 1.52, produced from 67.0 parts by weight of a diamine with the structure:

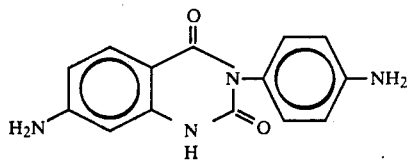

and 87.2 parts by weight of a diamine with the structure:

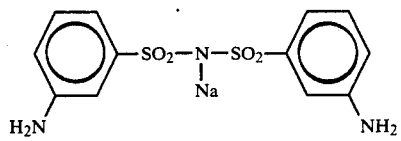

and 101.5 parts by weight of isophthalic acid dichloride, was used for producing a casting solution comprising 15 g of the polycondensate, 6 g of $CaCl_2$ and 79 g of N-methyl pyrrolidone. The casting solution was cast into a film with a thickness of 350μ. The solvent was evaporated for 20 minutes at 60° C., after which the plate was immersed in water. This membrane was tested as follows:

Test solution: 0.1% aqueous solution of a dye (Siriuslichtblau G)
Pressure: 20 bars
Throughflow: 3800 liters/m²d
Retention: 99.9%

A second membrane was prepared from this casting solution, dried for 20 minutes at 80° C. and subsequently tested with a 3% aqueous sucrose solution:
Pressure: 20 bars
Throughflow: 1450 liters/m²d
Retention: 75%

EXAMPLE 3

A copolyamide with a relative viscosity $\eta_{rel}$ of 1.49, produced as in Example 1 from 40.2 parts by weight of a diamine with the following structure:

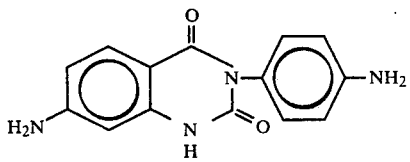

and 122.2 parts by weight of a diamine with the structure:

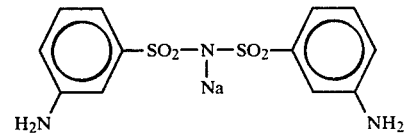

and 101 parts by weight of isophthalic acid dichloride, was made up as follows into a casting solution: 15 g of copolyamide 6 g of CaCl$_2$ and 79 g of N-methyl pyrrolidone. A 350$\mu$ thick film was prepared from this casting solution and treated for 20 minutes at 60° C. This film showed the following membrane properties:

Test solution: 0.1% aqueous dye solution (Siriuslichblau G)
Pressure: 20 bars
Throughflow: 5000 liters/m$^2$d
Retention: 99%

EXAMPLE 4

A solution polycondensation reaction was carried out in accordance with Example 1. A copolyamide with a relative viscosity $\eta_{rel}$ of 2.2 was obtained from 15.1 parts by weight of m-phenylenediamine, 195.5 parts by weight of a diamine with the structure:

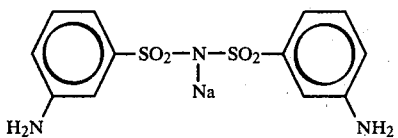

and 142.2 parts by weight of isophthalic acid dichloride. A casting solution of 10% of copolyamide, 86% of N-methyl pyrrolidone and 4% of CaCl$_2$ was prepared in the same way as in the previous Examples. A film cast in a thickness of 250$\mu$ was dried for 20 minutes at a temperature of 100° C. The finished film was tested as follows:

| (a) | Test solution: | 0.1% dye solution (Siriuslichtblau G) |
| --- | --- | --- |
|  | Pressure: | 20 bars |
|  | Throughflow: | 3700 litres/m$^2$d |
|  | Retention: | 99.7% |
| (b) | Test solution: | 3.5% sodium chloride solution |
|  | Pressure: | 20 bars |
|  | Throughflow: | 1600 litres/m$^2$d |
|  | Desalting: | 0% |

EXAMPLE 5

A copolyamide with a relative viscosity $\eta_{rel}$ of 2.50 was produced as in Example 1 from 108.0 parts by weight of a diamine with the structure:

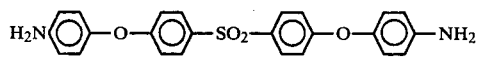

87.2 parts by weight of a diamine with the structure:

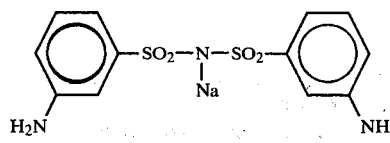

and 101.5 parts by weight of isophthalic acid dichloride. A solution containing 10 g of the polymer, 4 g of CaCl$_2$ and 86 g of N-methyl pyrrolidone was prepared. A film cast in a thickness of 250$\mu$ was treated for 20 minutes at 50° C. The membrane thus produced was tested as follows:

| (a) | Test solution: | 0.1% dye solution |
| --- | --- | --- |
|  | Pressure: | 20 bars |
|  | Throughflow: | 4450 litres/m$^2$d |
|  | Retention: | 99.9% |
| (b) | Test solution: | 3.5% sodium chloride solution |
|  | Pressure: | 20 bars |
|  | Throughflow: | 3360 litres/m$^2$d |
|  | Desalting: | 0% |

A 250$\mu$ thick film was dried for 20 minutes at 60° C. and tested with a 3% aqueous sucrose solution.
Pressure: 20 bars
Throughflow: 2050 liters/m$^2$d
Retention: 40%

EXAMPLE 6

As described in Example 1, a 10% solution of a copolyamide ($\eta_{rel}$=2.77), obtained from 73.0 parts by weight of the following diamine:

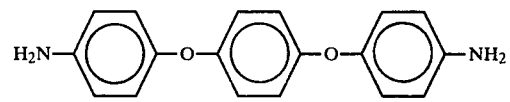

and 82 parts by weight of the diamine:

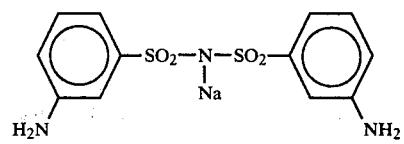

and 101.5 parts by weight of isophthalic acid dichloride, in N-methyl pyrrolidone with an addition of 4% of CaCl$_2$ was prepared. A membrane was cast in a thickness of 250$\mu$ and the solvent was evaporated off for 20 minutes at 50° C. The results of this membrane and the following membranes are summarized hereinafter in a Table.

EXAMPLE 7

12% of a copolyamide ($\eta_{rel}$=2.36), produced as in Example 1 from 25.0 parts by weight of the following diamine:

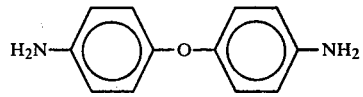

and 43.7 parts by weight of the diamine containing disulphimide groups (as in Examples 1 to 6) and 50.8 parts by weight of isophthalic acid dichloride, was dissolved in N-methyl pyrrolidone with addition of 4.8% of CaCl$_2$. A 250$\mu$ thick film was cast from the casting solution and dried for 20 minutes at 60° C.

EXAMPLE 8

10% of a copolyamide ($\eta_{rel}$=2.05), produced as in Example 1 from 102.5 parts by weight of the diamine:

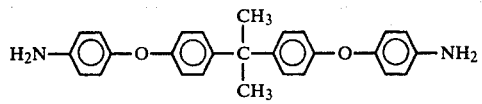

and 87.2 parts by weight of the diamine containing disulphimide groups (as in Examples 1 to 6) and 101.5 parts by weight of isophthalic acid dichloride, were dissolved in N-methyl pyrrolidone with addition of 4% of CaCl$_2$. The membrane was dried for 20 minutes at 50° C.

EXAMPLE 9

A copolyamide with a relative viscosity $\eta_{rel}$ of 2.5 was obtained from 56.5 parts by weight of the diamine:

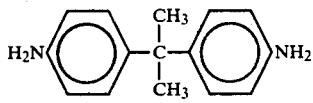

87.2 parts by weight of the following diamine:

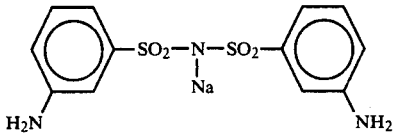

and 101.5 parts by weight of isophthalic acid dichloride, by solution polycondensation in the same way as described in Example 1. A 10% solution of the polymer with 4% of CaCl$_2$ in N-methyl pyrrolidone was used for producing the membrane. The conditions under which the membrane was produced were the same as in Example 8.

A film prepared from the same casting solution (dried for 20 minutes at 60° C.) was tested with a 3% sucrose solution.
Pressure: 20 bars
Throughflow: 2450 liters/m$^2$d
Retention: 53%

EXAMPLE 10

A copolyamide with a relative viscosity $\eta_{rel}$ of 2.9 was obtained from the same components as in Example 9, but in different quantitative ratios (33.9 parts by weight, 122.0 parts by weight and 101.5 parts by weight). A casting solution was prepared from this product under the same conditions as before. A membrane (cast thickness 250μ, drying conditions: 20 minutes at 70° C.) was prepared from this solution.

EXAMPLE 11

A copolyamide with a relative viscosity $\eta_{rel}$ of 1.74 was obtained from 37.2 parts by weight of the following diamine:

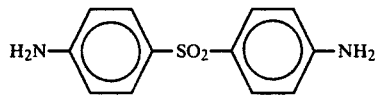

122.0 parts by weight of the diamine containing disulphimide groups:

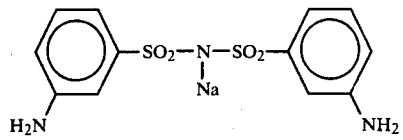

and 101.5 parts by weight of isophthalic acid dichloride in the same way as described in Example 1. A membrane was produced under the same conditions as in Example 10.

| Example No. | Test Solution | Pressure [bars] | Throughflow [liters/m$^2$d] | Retention [%] |
|---|---|---|---|---|
| 6 | 0.1% of dye (Siriuslichtblau G) | 20 | 4000 | 99.7 |
| 7 | 0.1% of dye (Siriuslichtblau G) | " | 2450 | 99 |
| 8 | 0.1% of dye (Siriuslichtblau G) | " | 1800 | 97.5 |
| 9 | 0.1% of dye (Siriuslichtblau G) | " | 2700 | 99 |
| 10 | 0.1% of dye (Siriuslichtblau G) | " | 2710 | 99 |
| 11 | 0.1% of dye (Siriuslichtblau G) | " | 3150 | 99 |

We claim:
1. A water-insoluble semipermeable membrane consisting of an aromatic polyamide containing at least 20 mol % of structural segments containing disulphimide groups and having a relative viscosity $\eta_{rel}$ of $\geq 1.4$, as measured on a 0.5% N-methyl pyrrolidone solution at 20° C.

2. Semipermeable membrane as claimed in claim 1, consisting of an aromatic polyamide containing disulphimide groups, wherein up to 100 mol % of the aromatic polyamide, based on the total quantity of the structural segments derived from a diamine or from a dicarboxylic acid dihalide, consist of the structural elements containing a disulphimide group and corresponding to the formula:

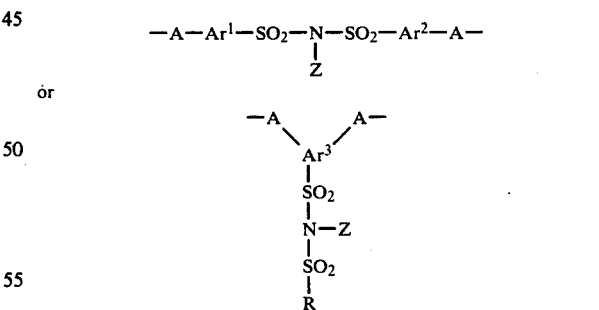

in which
Ar$^1$ and Ar$^2$ may be the same or different and represent divalent aromatic radicals, consisting of one or of several condensed aromatic rings or of aromatic rings attached to one another through a single bond or through a —CH$_2$—, —O— —S— or —SO$_2$— group, and
their alkyl and halogen substitution products,
Ar$^3$ represents a trivalent aromatic radical,
R represents a C$_{1-4}$ alkyl, phenyl or substituted phenyl substituted by alkyl or halogen, Z is hydrogen or an alkali metal, and A represents the amide group of the formula —CONH— or —NHCO—.

3. Semipermeable membrane as claimed in claim 1, consisting of an aromatic polyamide containing disulphimide groups, wherein from 20 to 80 mol percent of the aromatic polyamide, based on the total quantity of the structural segments derived from a diamine or from a dicarboxylic acid dihalide, consist of the structural segments containing a disulphimide group and corresponding to the formula:

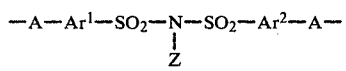

or

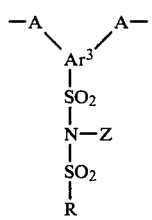

in which
- $Ar^1$ and $Ar^2$ may be the same or different and represent divalent aromatic radicals, consisting of one or several condensed aromatic rings or of aromatic rings attached to one another through a single bond or through a —CH$_2$—, —O—, —S— or —SO$_2$— group, and their alkyl and halogen-substitution products,
- $Ar^3$ represents a trivalent aromatic radical,
- R is a $C_{1-4}$ Alkyl, phenyl or phenyl substituted by alkyl or halogen,
- Z is hydrogen or an alkali metal, and
- A represents the amide group of the formula —CONH— or —NHCO—.

4. Semipermeable membrane as claimed in claim 3, wherein up to 80 mol % of the aromatic polyamide, based on the total quantity of the structural segments derived from the diamine or dicarboxylic acid, consist of an aromatic heterocycle-containing diamine or of an aromatic heterocycle-containing dicarboxylic acid.

5. Semipermeable membrane as claimed in claim 1, wherein the disulphimide groups are derived from a diamine corresponding to the formula:

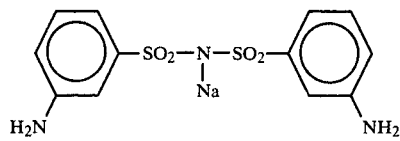

6. Semipermeable membrane as claimed in claim 1, wherein the disulphimide groups are derived from a compound selected from the group consisting of
4,4'-diaminodiphenyl disulphimide
3,4'-diaminodiphenyl disulphimide
3,3'-diamino-4,4'-dichlorodiphenyl disulphimide
4,4'-diamino-3,3'-dichlorodiphenyl disulphimide
3,3'-diamino-4-chlorodiphenyl disulphimide
diphenyl disulphimide dicarboxylic acid dichloride-4,4'
diphenyl disulphimide dicarboxylic acid dichloride-3,3'
diphenyl disulphimide dicarboxylic acid dichloride-3,4'
4-(p-aminophenoxy)-3'-aminodiphenyl disulphimide
5-aminophenyl-4'-aminonaphthyl-(1)-disulphimide
3,5-diaminodiphenyl disulphimide
3,5-diamino-5-chlorodiphenyl disulphimide
3,5-diaminophenylmethyl disulphimide
diphenyl disulphimide dicarboxylic acid dichloride-3,5
phenylmethyl disulphimide dicarboxylic acid dichloride-3,5
1,5-diaminonaphthyl-(3)-phenyl disulphimide
1,4-diaminonaphthyl-(6)-phenyl disulphimide and
1,5-diaminonaphthyl-(3)-methyl disulphimide.

7. Semipermeable membrane as claimed in claim 2 consisting of an aromatic disulphimide-containing polyamide, wherein the moiety $Ar^3$ in the disulphimide segment is selected from the group consisting of

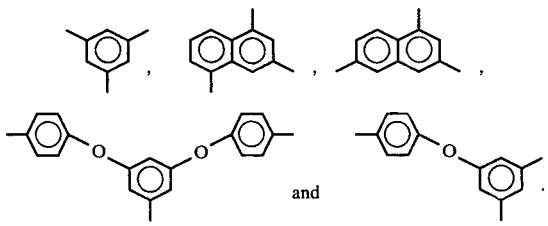

and

* * * * *